(12) United States Patent
Klinger et al.

(10) Patent No.: US 6,500,087 B2
(45) Date of Patent: Dec. 31, 2002

(54) ELECTRIC MOTOR WITH EPICYCLIC GEAR SYSTEM

(75) Inventors: Raimund Klinger, Ettenheim-Wallburg (DE); Bernd Cihlar, Freiburg (DE)

(73) Assignee: Berger Lahr GmbH & Co. KG, Lahr (DE)

( * ) Notice: Subject to any disclaimer, the term of this patent is extended or adjusted under 35 U.S.C. 154(b) by 12 days.

(21) Appl. No.: 09/764,569

(22) Filed: Jan. 18, 2001

(65) Prior Publication Data

US 2001/0010439 A1 Aug. 2, 2001

(30) Foreign Application Priority Data

Jan. 27, 2000 (DE) ......................................... 100 03 452

(51) Int. Cl.[7] ............................................. F16H 48/06
(52) U.S. Cl. ...................................... 475/149; 475/902
(58) Field of Search ................................. 475/149, 323, 475/324, 339, 331, 335, 901, 902; 123/399

(56) References Cited

U.S. PATENT DOCUMENTS

| | | | |
|---|---|---|---|
| 4,712,451 A | * 12/1987 | Morishita et al. | ........... 475/902 |
| 5,127,279 A | * 7/1992 | Barthruff | .................... 475/902 |
| 6,092,506 A | * 7/2000 | Takagi et al. | ................ 123/399 |

FOREIGN PATENT DOCUMENTS

| | | |
|---|---|---|
| DE | 8513219 | 7/1986 |
| DE | 19827756 A1 | 12/1999 |
| EP | 0111350 | 6/1984 |
| FR | 1437856 | 3/1966 |

\* cited by examiner

*Primary Examiner*—Christopher P. Schwartz
*Assistant Examiner*—Melanie Torres
(74) *Attorney, Agent, or Firm*—Volpe and Koenig, P.C.

(57) ABSTRACT

An electric motor (1) or drive motor has a cylindrical, possibly, however, even conical or disk-shaped rotor (2) and a cavity or interior space (4) surrounded by the rotor (2) and/or its stator (3), into which protrudes in the installed position an epicyclic gear system (5) or planetary gear system which is driven by the electric motor (1). The electric motor (1) has a toothed power output element, for example, a cantilevered gear shaft (6), with which meshes an opposing-teeth-exhibiting power input element, for example, the planetary gears (7) of the epicyclic gear system (5). The power input element of the epicyclic gear drive (5) having the opposing teeth is preassembled with additional drive parts, for example, the carrier (8) for the planetary gears (7) and the planetary ring gear (17) as well as an output shaft (10) and a housing (13) into a unit (9) or subassembly which, during final assembly, can be combined together with the electric motor (1) and its toothed power output element so that the electric motor (1) and the epicyclic gear system (5) can each be separately preassembled (FIG. 1).

9 Claims, 3 Drawing Sheets

ELECTRIC MOTOR WITH EPICYCLIC GEAR SYSTEM

BACKGROUND

The present invention concerns an electric motor with an essentially cylindrical or conical or possibly disk-shaped rotor and with an interior space surrounded by this rotor and/or its stator, into which protrudes at least partially an epicyclic gear system, in particular a planetary gear system) driven by the electric motor. The electric motor includes a toothed power output element which meshes in the installed position with opposing teeth of a power input element of the epicyclic gear system.

An electric motor of this type with an epicyclic gear system designed as a planetary gear drive is known from DE-GM 85 13 219.5. Here, the sun gear shaft of this arrangement is joined with the rotor of the electric motor and thus forms the toothed output element of the motor. Meshing with this sun gear shaft in the installed position are planetary gears combined, for their part, in a carrier, which makes possible a gearing down. In addition, the planetary gears can also run inside a ring gear.

In manufacturing such an electric motor with epicyclic gear drive, i.e., such a drive motor, the motor manufacturer must usually assemble the individual drive parts, which means a significant logistical and assembly effort. During subsequent inspection, occurring defects normally require the disassembly of at least the drive parts and subsequent reassembly, with a corresponding additional expense.

From EP 0 111 350 A1, an electric motor is known with a conical or almost disk-shaped rotor whose stator magnets surround an inner space called a torus, which serves, however, in accommodating a brake rather than an epicyclic gear drive.

SUMMARY

The object of the present invention is to provide an electric motor or drive motor of the type mentioned above in which assembly by the motor manufacturer and any search for defects are simplified.

In solving this problem, it is provided that the power input element of the epicyclic gear system which includes the opposing teeth is preassembled with additional drive parts into a unit and that the power input element of this unit can be engaged around the toothed power output element of the electric motor and preassembled therewith.

As a result, it is possible to preassemble practically the entire epicyclic gear system and also, if necessary, to pre-examine it for defects so that a drive manufacturer can also be enlisted for this purpose. The motor manufacturer then only needs to push this assembled unit into the interior space of the motor in line with the amount that the epicyclic gear drive is supposed to extend into this interior space in the installed position, through which interlocking with the power output element previously assembled or already present there occurs. The motor and drive can then be additionally joined to each other. Above all, disassembly in the case of occurring defects is also correspondingly simple. The motor manufacturer thus has considerably reduced the expense related to the assembly of the epicyclic gear system which protrudes at least partially into the electric motor which he has manufactured.

It is appropriate here if the entire epicyclic gear drive is preassembled and is engageable with its power input element having the opposing teeth with the toothed power output element of the electric motor and can be especially releasably joined to the electric motor. This means that the motor manufacturer can order a practically complete epicyclic gear system and can join it to his electric motor without having to install individual drive parts in the interior of the electric motor. Prior to this final assembly, the epicyclic gear system and the electric motor can also be individually examined for defects, which means a further advantage since any defects can be found more quickly and directly assigned to the individual units.

The electric motor and the epicyclic gear system can be joined together, for example, via screws or the like, especially via screws running through the drive and/or the motor housing, or by gluing the housing parts contacting each other in the installed position. Thus, the motor manufacturer only needs to join the epicyclic gear system to the electric motor and then install the screws or carry out a gluing process during the joining together, which means considerable simplification and a corresponding saving of time compared to individual assembly of the individual drive parts to the motor.

An especially advantageous embodiment of the electric drive motor according to the present invention can be based on the toothed power output element of the electric motor being a sun gear shaft, which forms the output shaft of the electric motor and on which the opposing-teeth-exhibiting power input element or elements of the epicyclic gear system, especially the planetary gears of a planetary gear system, can be mounted in the axial direction. As a result, the planetary gears also automatically assume their installed position, namely, meshing with the sun gear shaft.

A modified embodiment can be based on the electric drive motor having an interiorly cylindrical rotor provided with inner teeth as the toothed power output element forming the ring gear of an epicyclic or planetary gear system and into which can be inserted the carrier-held planetary gears or similar opposing gears together with the other drive parts. Thus, if a planetary ring gear is used as the power output element of the electric motor, the basic idea of the present invention can still be realized and a preassembled gear drive unit can be used in which the final positive coupling between electric motor and epicyclic gear system is produced through the fact that the planetary gears with their teeth are inserted or pushed into engagement with the interior teeth of the ring gear and brought into their installed position.

A refinement of the arrangement in which the toothed power output element of the electric motor is the sun gear shaft of an epicyclic gear system can be based on the cantilevered sun gear shaft being joined in rotationally fixed fashion with the rotor of the electric motor, for example, through gluing, and carrying a bearing either directly or on a surrounding sleeve section rotationally fixed to or joined as one piece with the rotor. An axial continuation of the planetary ring gear of the epicyclic or planetary gear system fits on said bearing and is simultaneously mountable upon slipping the planetary gears over the teeth of the sun gear shaft. In this way, one has as the "intersection point" between the electric motor and the epicyclic gear system, on the one hand, the teeth on the sun gear shaft and, on the other hand, the bearing preassembled with this shaft, at least two points thus coming into contact during pushing or plugging together, namely, the toothed elements, on the one hand, and the support point, on the other. It should be mentioned that the bearing, however, could be initially preassembled within the planetary ring gear and, upon joining together the epicyclic gear system and the electric motor, could arrive at the opposing support point in the area of the sun gear shaft.

In the assembled position, a sealing ring, especially an O-ring, can be provided between the bearing-surrounding continuation of the planetary ring gear and this bearing. As a result, one can keep lubricant from the gear system from getting into the motor. This sealing or O-ring can also be provided here already preassembled especially on the continuation of the planetary ring gear that comes into contact with the outside of the motor-side bearing upon shoving together the gear drive and motor.

A further advantageous refinement of the present invention which is especially advantageous and favorable for the precision involved in the cooperation of the electric motor with the epicyclic gear system can be based on the planetary ring gear belonging to the assembled unit of the epicyclic gear system having a centering element effective with respect to the interior space or a continuation of the interior space of the electric motor, especially a centering element effective with respect to the stator, which centering element arrives at its installed position upon joining or plugging together. A frustoconical or cylindrical centering element or centering surface positioned concentric to the middle of the motor and the gear drive can thus be provided appropriately on the outside of the planetary ring gear or a continuation of this planetary ring gear, which centering element utilizes the shape of the stator, arrives at its installed position upon joining or plugging together, and ensures the required accuracy and precision of the coaxial arrangement of the sun gear shaft and the planetary gears.

The centering element can be situated here in the installed position against the axially extreme gear-drive-facing edge of the inside of the stator. Located on the outside of the planetary ring gear, this centering element can be offset, viewed in the direction of insertion, with respect to the point of support and the end walls of the planetary gears facing the electric motor, which has the advantage that the joining or insertion process has progressed already relatively far before the relatively narrow-tolerance centering element needs to be fitted in place. In this way, at least the first part of the joining process can proceed with ease of motion.

Especially upon combination of a few or several of the above-described features and measures, it becomes possible to preassemble the electric motor and the epicyclic or planetary gear system each at a different location, whereupon these components forming the electric drive motor only need to be plugged together and attached to each other. The point of intersection can be composed here of a rotor-side bearing and a centering element so that the insertion or joining process is very simple. Defects can be detected and eliminated and later repairs carried out in correspondingly simple fashion before final assembly or even after this assembly.

BRIEF DESCRIPTION OF THE DRAWINGS

A preferred embodiment of the present invention is described in more detail below on the basis of the drawings. These show, in part, in schematic representation.

DETAILED DESCRIPTION OF THE PREFERRED EMBODIMENTS

Figure 2:
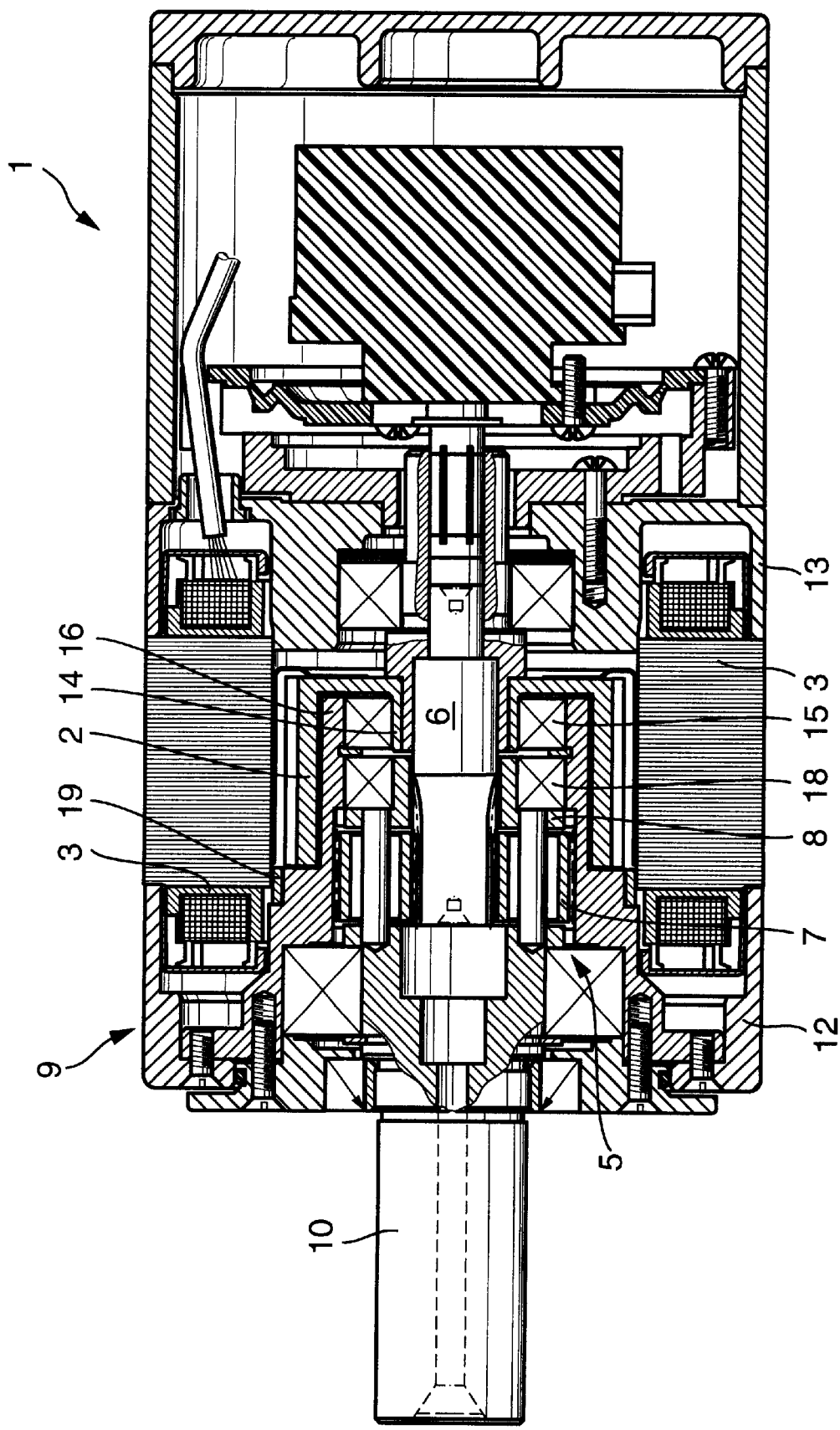
FIG. 2 is a longitudinal section of the electric motor with epicyclic gear system corresponding to FIG. 1 after joining of the two assembled units together.
Figure 3:
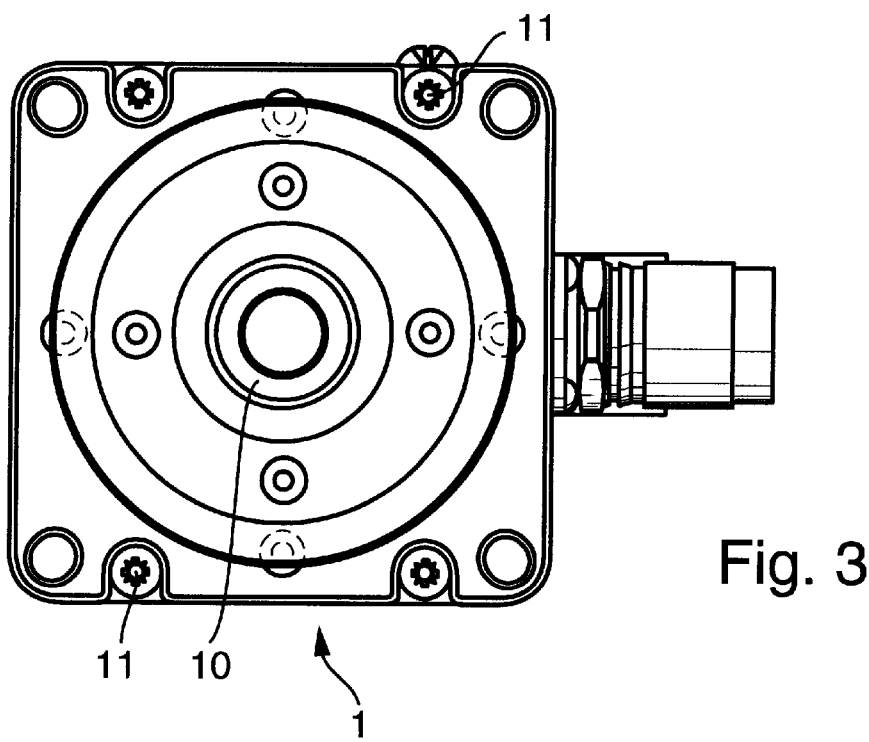
FIG. 3 is a frontal view of the electric motor combined with the epicyclic gear system looking toward the screws serving for mutual attachment of the assembled units.

An electric motor (designated as a whole by 1) with an essentially cylindrical rotor 2 and with an approximately cylindrical interior space 4 surrounded by the rotor 2 and its stator 3 is designed as a drive motor. For this purpose, the electric motor 1 is joined in its installed position according to FIG. 2 with an epicyclic gear system 5, which is preferably a planetary gear system that the motor drives which protrudes partially into an interior space 4 of the electric motor 1.

The electric motor 1 has a toothed power output element, in the embodiment shown, a sun gear shaft 6, which meshes with a power input element exhibiting matching opposing teeth, in the embodiment shown, with the planetary gears 7, of epicyclic gear system 5.

Figure 1:
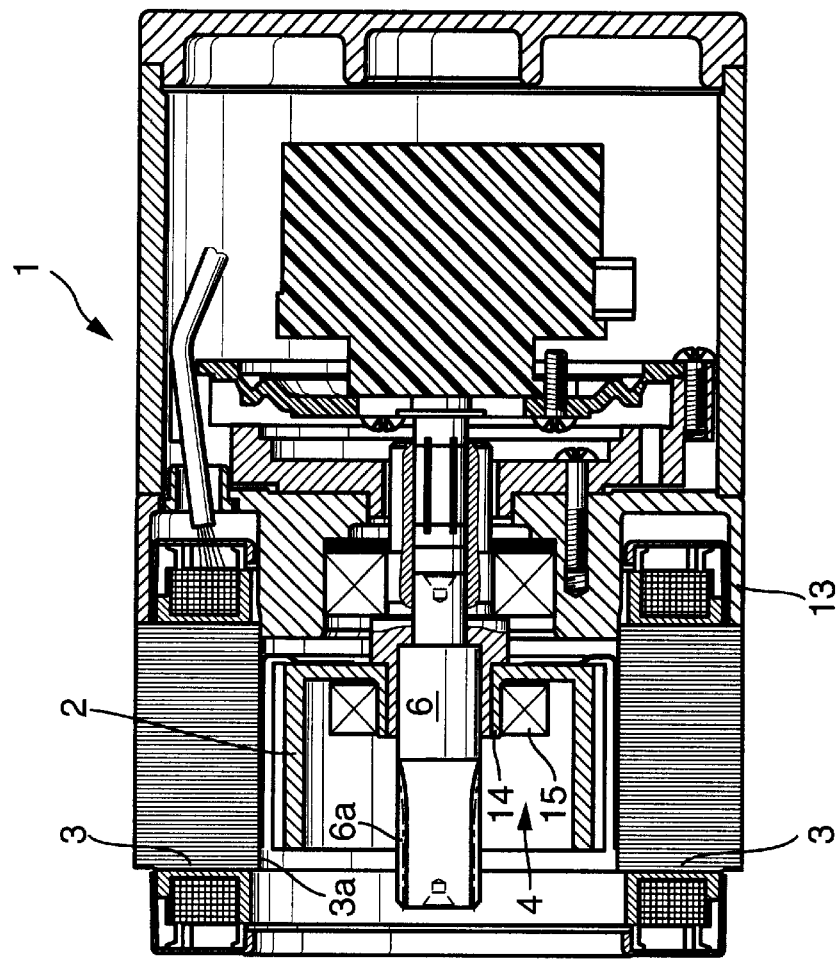
FIG. 1 is a longitudinal section view of an electric motor and an epicyclic gear system joinable therewith, both of these components having been preassembled in each case into a unit, shown prior to final plugging together into the installed position.

As shown in FIG. 1, the power input element exhibiting the opposing teeth, in this case, the planetary gears 7 held together by a carrier 8, is preassembled into a unit or subassembly designated as a whole by 9. The power input element belonging to this assembled unit 9, i.e., the planetary gears 7, can be engaged around the toothed power output element belonging to the electric motor 1 and preassembled therein, in the present embodiment, around the sun gear shaft 6. If one compares FIGS. 1 and 2, it is very clear that the electric motor 1 and assembled unit 9 can be simply plugged together in the axial direction from the position shown in FIG. 1 in order to achieve the installed position according to FIG. 2. In this way, the epicyclic gear system 5 and the electric motor 1 can each be assembled separately from each other, so that the motor manufacturer does not need to assemble the individual drive parts. Accordingly, both assemblies can also be separately checked and, if necessary, repaired.

It should still be mentioned that the carrier 8 in the preferred embodiment converts as one piece into the output shaft 10 of the epicyclic gear system 5.

Figure 4:
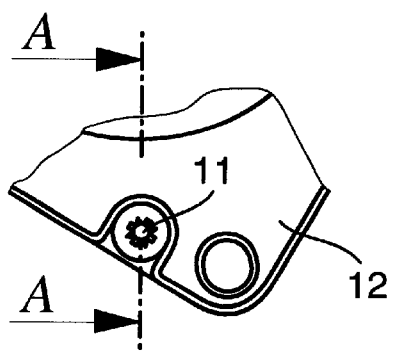
FIG. 4 is an enlarged detail of a screw for attaching the epicyclic gear system to the electric motor.
Figure 5:
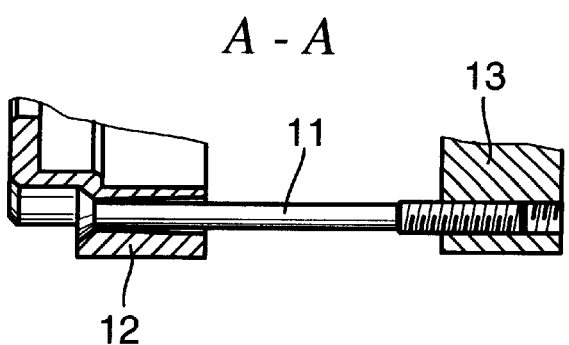
FIG. 5 is a longitudinal section of the detail represented in FIG. 4 along line A—A in FIG. 4, with the attachment screw engaging, on the one hand, a part of the housing of the epicyclic gear system and threading, on the other hand, in a part of the housing of the electric motor.

The entire epicyclic gear system 5 can thus be preassembled and can be engaged with the power input unit having opposing teeth with the toothed power output element of electric motor 1, whereupon it can be releasably attached to electric motor 1 via screws 11 so that simple disassembly is also made possible. It is especially recognized from FIGS. 4 and 5 that the screws 11 pass through drive housing 12 and thread into motor housing 13; however, the joint could also be a glue joint.

Sun gear shaft 6 serving as the toothed power output element of electric motor 1 is combined in rotationally fixed fashion with rotor 2, for example, by shrink-fitting, gluing, or other suitable technique. The sun gear shaft 6 carries at its end opposite the teeth 6a on a sleeve section 14 combined with rotor 2 a bearing 15, preferably a roller bearing, on which an axial continuation 16 of the planetary ring gear 17 of the epicyclic gear system 5 is located, with the ring gear being stationary in this embodiment in its installed position. The continuation 16 can be slipped simultaneously into place upon engaging the planetary gears 7 around the teeth 6a of the sun gear shaft 6. It is recognized from FIG. 1 that the continuation 16 protrudes in the axial direction, said continuation projecting axially with respect to another bearing 18 positioned in assembled unit 9 and surrounding in FIG. 2 the outside of bearing 15 so that both bearings 15 and 18 are then active in this installed position.

Here, one can provide in not more closely described fashion a sealing ring, for example an O-ring, in the assembled position between continuation 16 surrounding bearing 15 and the bearing 15 in order to protect electric motor 1 from epicyclic gear system 5 and its lubricant.

The planetary ring gear 17 of the assembled unit 9 of epicyclic gear system 5, on whose interior teeth the planetary gears 7 run in known fashion upon turning of the sun gear shaft 6, has a centering element 19 effective with respect to interior space 4 of electric motor 1 or with respect to a continuation of the interior space 4, which element in the present embodiment represents a centering element 19 opposing the stator 3 at its end facing the gear system 5 and achieves its installed position upon joining or plugging together. In FIG. 1, the centering element 19 is shown which is positioned on a diametral enlargement of the planetary ring gear 17 so that it corresponds with its outer diameter to the inner diameter of the stator 3 at its mating centering element 3a.

In the installed position, centering element 19 is thus positioned (viewed in the axial direction) against the extreme gear-system-5-facing edge of the inside of the stator 3. Located on the outside of the planetary ring gear 17 at its diametral enlargement, this centering element 19 is offset viewed in the insertion direction with respect to the point of support, i.e., with respect to the bearing 18 and with respect to the end walls of the planetary gears 7 facing the electric motor 1. It is especially recognized from FIG. 1 that centering element 19 ends approximately above the axial center of planetary gears 7. If one views FIGS. 1 and 2 simultaneously, it becomes clear that upon plugging together, the teeth 6a of the sun gear shaft 6 first get into the intermediary space between the planetary gears 7. Then, during further insertion, the continuation 16 engages around the bearing 15. Finally, at the end of the joining process, the centering element 19 engages in mating centering element 3a of stator 3, i.e., during the final centering involving relatively narrow tolerances, the greatest portion of the insertion process has already been completed, that is, the first part of this joining process can proceed with ease of motion and only the last precise centering requires a somewhat greater force without any danger of canting.

The electric motor 1 or drive motor has a cylindrical, possibly, however, even conical or disk-shaped rotor 2 and a cavity or interior space 4 surrounded by this rotor 2 and/or its stator 3, into which protrudes in the installed position an epicyclic gear system 5 or planetary gear system driven by this electric motor 1. The electric motor 1 has a toothed power output element, for example, a cantilevered sun gear shaft 6, with which meshes an opposing-teeth-exhibiting power input element, for example, planetary gears 7 of epicyclic gear system 5. The power input element of the epicyclic gear system 5 having the opposing teeth is preassembled with additional drive parts, for example, the carrier 8 for the planetary gears 7 and the planetary ring gear 17 as well as an output shaft 10 and a housing 13 into a unit 9 or subassembly and the latter, during final assembly, can be combined together with the electric motor 1 and its toothed power output element so that the electric motor 1 and the epicyclic gear system 5 can each be separately preassembled.

What is claimed is:

1. Electric motor (1) having an essentially cylindrical, conical or disk-shaped rotor (2) and with an open cylindrical interior space (4) surrounded by at least one of the rotor (2) and a stator (3), an epicyclic gear system (5), driven by the electric motor (1), which protrudes at least partially into the interior space, the electric motor (1) having a toothed power output element, which is formed by inner teeth on the cylindrical interior space of the rotor which act as a ring gear of the epicyclic gear system (5), and which meshes in an installed position with opposing teeth of a power input element of the epicyclic gear system (5), the epicyclic gear system including carrier-(8)-held planetary gears (7) that are inserted into the rotor (2), the power input element of the epicyclic gear system (5) with the opposing teeth is preassembled with additional drive parts into a unit (9) and the power input element of the unit (9) is engageable with the toothed power output element of the electric motor (1) and assembled therewith.

2. Electric motor according to claim 1, wherein the entire epicyclic gear system (5) is preassembled and is engageable via the power input element with the opposing teeth with the toothed power output element of the electric motor (1) and is releasably joined to the electric motor (1).

3. Electric motor according to claim 1 wherein the electric motor and the epicyclic gear system are joined together via screws (11) that extend through a gear system housing (12) and the motor housing (13).

4. Electric motor according to claim 1, wherein the toothed power output element of the electric motor (1) is a cantilevered sun gear shaft (6) and the opposing-teeth-exhibiting power input element of the epicyclic gear system is planetary gears (7) of a planetary gear system mounted in an axial direction.

5. Electric motor according to claim 1, wherein the gear system having (12) and the motor having (13) are joined together via glue on contacting portions of the housings.

6. Electric motor (1) having an essentially cylindrical, conical or disk-shaped rotor (2) and with an interior space (4) surrounded by at least one of the rotor (2) and a stator (3), an epicyclic gear system (5), driven by the electric motor (1), which protrudes at least partially into the interior space, the electric motor (1) having a toothed power output element which meshes in an installed position with opposing teeth of a power input element of the epicyclic gear system (5), the power input element of the epicyclic gear system (5) with the opposing teeth is preassembled with additional drive parts into a unit (9), the power input element of the unit (9) is engageable with the toothed power output element of the electric motor (1) and assembled therewith, the toothed power output element of the electric motor (1) is a sun gear shaft (6) that is joined in a rotationally fixed fashion with the rotor (2), and carries a bearing (15) either directly or on a surrounding sleeve section (14) rotationally fixed to or joined as one piece with the rotor (2), the epicyclic gear system includes planetary gears (7) and a planetary ring gear (17) with an axial continuation (16) that fits on said bearing and is simultaneously mountable upon slipping the planetary gears (7) over teeth (6a) of the sun gear shaft (6).

7. Electric motor according to claim 6, wherein in the installed position, a sealing ring is provided between the axial continuation (16) of the planetary ring gear and the bearing (15).

8. Electric motor according to claim 7, wherein the planetary ring gear (17) of the assembled unit (9) of the epicyclic gear system (5) includes a centering element (19) effective with respect to the interior space (4) or a continuation of the interior space of the electric motor (1), which arrives at an installed position upon joining or plugging together to the assembled position.

9. Electric motor according to claim 8, wherein the centering element (19) is positioned against an axially extreme gear-system-facing edge of an inside portion of the stator (3) and the centering element is located on an outside of the planetary ring gear (17), and is offset in an insertion direction, with respect to a point of support and end walls of the planetary gears (7) facing the electric motor (1).

* * * * *

UNITED STATES PATENT AND TRADEMARK OFFICE
CERTIFICATE OF CORRECTION

PATENT NO.   : 6,500,087 B2
DATED        : December 31, 2002
INVENTOR(S)  : Klingler et al.

It is certified that error appears in the above-identified patent and that said Letters Patent is hereby corrected as shown below:

<u>Title page,</u>
Item [73], please add the second assignee so that both assignees are listed as follows:
-- [73]   Assignee: Berger Lahr GmbH & Co. KG, Lahr and
Neugart GmbH & Co., Kippenheim (both of DE) --

Signed and Sealed this

Eleventh Day of November, 2003

JAMES E. ROGAN
*Director of the United States Patent and Trademark Office*